(12) United States Patent
Fletcher

(10) Patent No.: US 7,392,277 B2
(45) Date of Patent: Jun. 24, 2008

(54) CASCADED DOMINO FOUR-TO-TWO REDUCER CIRCUIT AND METHOD

(75) Inventor: Thomas D. Fletcher, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1200 days.

(21) Appl. No.: 09/893,868

(22) Filed: Jun. 29, 2001

(65) Prior Publication Data

US 2003/0014459 A1    Jan. 16, 2003

(51) Int. Cl.
    G06F 7/50    (2006.01)
(52) U.S. Cl. .................. 708/708; 708/629; 708/704
(58) Field of Classification Search ............... 708/629, 708/700, 702, 704, 708, 709
    See application file for complete search history.

(56) References Cited

U.S. PATENT DOCUMENTS

| | | | | |
|---|---|---|---|---|
| 3,340,388 A | * | 9/1967 | Earle | ............ 708/700 |
| 4,570,084 A | | 2/1986 | Griffin et al. | |
| 4,646,257 A | * | 2/1987 | Essig et al. | ............ 708/630 |
| 4,667,303 A | * | 5/1987 | Pfennings | ............ 708/702 |
| 5,491,653 A | * | 2/1996 | Taborn et al. | ............ 708/708 |
| 5,568,069 A | | 10/1996 | Chow | |
| 5,777,491 A | | 7/1998 | Hwang | |
| 5,977,789 A | | 11/1999 | Gayles | |
| 6,028,454 A | | 2/2000 | Elmasry et al. | |
| 6,065,033 A | * | 5/2000 | Jouppi | ............ 708/670 |
| 6,208,907 B1 | | 3/2001 | Durham et al. | |
| 6,466,960 B1 | * | 10/2002 | Winters | ............ 708/671 |

FOREIGN PATENT DOCUMENTS

JP    5-259893    10/1993

OTHER PUBLICATIONS

Yee et al, "Clock-Delayed Domino for Dynamic Circuit Design", IEEE Transactions on Very Large Scale Integration (VLSI) Systems, vol. 8, No. 4, Aug. 2000, pp. 425-430.
Yee et al, "Clock-Delayed Domino for Adder and Combinational Logic Design", IEEE, 1063-6404/96, pp. 332-337, 1996.
Jung, Perepelitsa, Sobelman, "Time Borrowing in High-Speed Functional Units Using Skew-Tolerant Domino Circuits," Proceedings, IEEE International Symposium on Circuits and Systems, pp. V-641-V-644, 2000.
Presentation by Carl Sechen dated Mar. 17, 2000.
Taub, *Digital Circuits and Microprocessors*, pp. 205-212, McGraw-Hill, 1982.
Related U.S. Appl. No. 10/020,447, filed Dec. 18, 2001.
Related U.S. Appl. No. 09/892,565, filed Jun. 28, 2001.
Related U.S. Appl. No. 09/956,903, filed Sep. 21, 2001.

* cited by examiner

*Primary Examiner*—Chuong D Ngo
(74) *Attorney, Agent, or Firm*—Kenyon & Kenyon LLP

(57) ABSTRACT

A cascaded differential domino four-to-two reducer. In an embodiment, the four-to-two reducer is constructed of a first three-to-two reducer and a second three-to-two reducer directly connected to the first three-to-two reducer. In a further embodiment, the first and second three-to-two reducer both include a symmetric carry generate gate.

28 Claims, 4 Drawing Sheets

CASCADED DOMINO FOUR-TO-TWO REDUCER CIRCUIT AND METHOD

FIELD OF THE INVENTION

Embodiments of the present invention relate to reducer circuits. In particular, embodiments of the present invention relate to the topology of cascaded domino four-to-two reducers.

BACKGROUND

Digital electronic devices such as microprocessors often contain numerous components that may perform sub-functions for the device. For example, the arithmetic logic unit (ALU) of a microprocessor typically contains one or more adders that receive a number of digital inputs and that output the sum of these inputs. As another example, an electronic device may contain multipliers that receive a number of digital inputs and output the result of a multiplication function performed on these inputs. Digital circuits such as adders and multipliers may themselves be made up of smaller digital circuits or logic gates such as, for example, a reducer. A reducer receives a number of input bits and provides sum and carry bits as outputs. For example, a three-to-two reducer may receive three input bits and provide a sum bit (i.e., the sum of the three input bits) and a carry bit (indicating if the addition of the three input bits generates a carry out) as outputs. A four-to-two reducer may receive four input bits and provide a sum bit and carry bit as outputs. As would be appreciated by a person of skill in the art, such a four-to-two reducer may also receive a carry in bit and provide an intermediate carry out bit (which may be absorbed by a neighboring four-to-two reducer), but such bits are not counted as part of the "four-to-two" because for counting purposes they cancel each other out.

The component circuits in digital devices often use domino logic. A domino circuit is a type of circuit that is arranged in stages (e.g., logic gates) with the outputs from one stage used as inputs into the next stage. The clock used with a domino circuit typically is delayed for each of the individual stages to provide a set-up time for the stages. The individual domino logic gates typically have one or more precharge blocks, which force the circuit to a known state during a precharge phase of a clock, and one or more evaluation blocks, which provide output values during an evaluation phase of the clock. Domino circuits generally have a static stage in between the domino stages. For example, the domino circuit may have an inverter between the domino stages or a static complimentary metal-oxide semiconductor (CMOS) gate between the domino stages. Another example is the zipper domino circuit, which has a P-channel metal-oxide semiconductor (PMOS) gate between the domino stages. In a cascaded domino circuit, the outputs from one N-channel metal-oxide semiconductor (NMOS) domino gate (i.e., a gate with NMOS transistors in the evaluation block) are directly connected to the inputs of another NMOS domino gate. Thus, a cascaded domino circuit does not have any invertors, static stages, or PMOS gates in the critical path of the logic.

Four-to-two reducers have not been constructed as cascaded domino circuits. Domino four-to-two reducers have been constructed by using three-to-two reducers, but such four-to-two reducers have used static CMOS stage(s) of logic between the three-to-two reducers. The static stages in these prior four-to-two reducers have an effect on the clocking of the circuit and, as is known in the art, a circuit may not operate correctly if it is not adequately sequenced. Thus, a topology for adequately sequencing a domino four-to-two reducer without static stages has not been known.

DETAILED DESCRIPTION

Embodiments of the present invention provide topologies for cascaded domino four-to-two reducers. The present invention eliminates static CMOS stages in the four-to-two reducer by sequentially clocking the differential logic stages with a small delay between stages. In an embodiment, the delay between stages is approximately the delay of an inverter with a fanout of two, a delay which depends upon the process technology. A person of skill in the art would appreciate that an inverter has a fanout of 2 if the load on the output is two times the load on the input.

Figure 1:
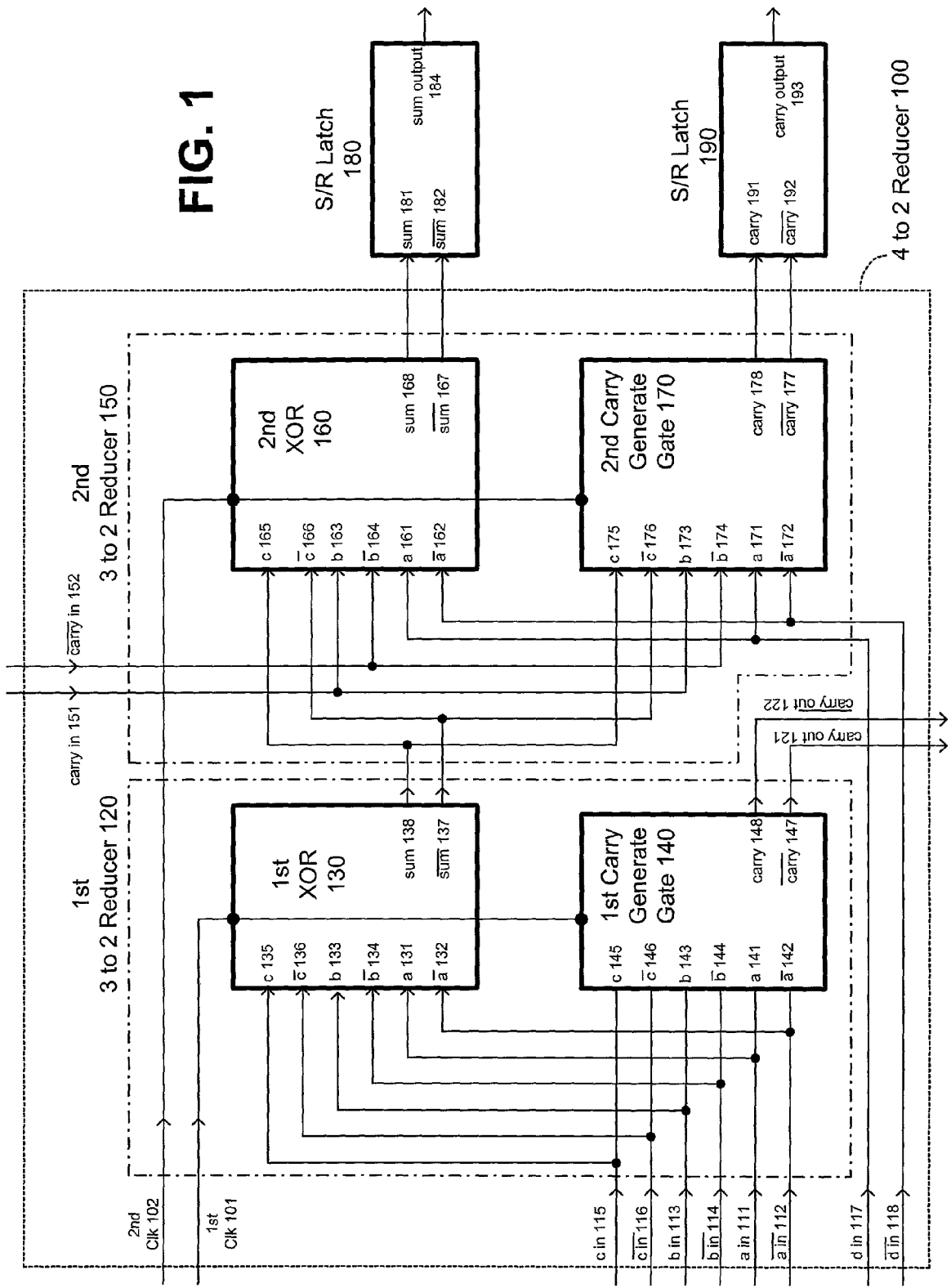
FIG. 1 is a partial block diagram of a symmetric differential domino four-to-two reducer according to an embodiment of the present invention.

According to one embodiment, an example of which is shown in FIG. 1, the four-to-two reducer is comprised of back-to-back three-to-two reducers. That is, outputs of the first three-to-two reducer may be directly connected to the second three-to-two reducer without passing through a static logic stage. As used herein, two components A and B are said to be "directly connected" if there is a logic path between the two components that does not have any other components (e.g., gates or transistors) between components A and B but may include lead lines or connector lines between the components. Two components that are directly connected may be said to be "back-to-back."

In a further embodiment, each three-to-two reducers is comprised of (1) a differential domino exclusive-OR (XOR) gate to provide a sum bit output, and (2) a differential three-input carry generate gate to provide a carry bit output. A differential circuit is a circuit that has two complimentary sets of input and output terminals. In a differential logic gate, the first set of input and output terminals maybe referred to as the "true" inputs and outputs, and the second set may be referred to as the "compliment" inputs and outputs. For example, a differential three-to-two reducer may have three true data inputs and three compliment data inputs, a true sum output and a compliment sum output, and a true carry output and a compliment carry output. A true input and the corresponding compliment input may be referred to as a single "differential input." Similarly, a true output and the corresponding compliment output may be referred to as a single "differential output."

The true and compliment outputs of the differential gates in a circuit should begin to switch with the same edge rate and should not be susceptible to pattern dependence. An embodiment of the present invention attains this criteria by using symmetric differential XOR gates and symmetric differential carry generate gates in the four-to-two reducer. A symmetric gate may be characterized by a having the load or capacitance for the true inputs to a symmetric gate being substantially the same as the load for the compliment inputs to the gate. In addition, a symmetric gate may be characterized by the pull down strength for the true outputs of the symmetric gate (i.e., the resistance of the transistors pulling down the outputs) being substantially the same as the pull down strength for the complement output(s), and the pull down strength for the true inputs being substantially the same as the pull down strength for the complement inputs. The Miller coupling may also be the same for the true inputs and complement inputs to the gate. In addition, the output drive strength may be the same for the true and compliment outputs of the symmetric gate.

FIG. 1 is a partial block diagram of a symmetric differential domino four-to-two reducer 100 according to an embodiment of the present invention. Four-to-two reducer 100 has four true data inputs labeled a in 111, b in 112, c in 113, and d in 117. Four-to-two reducer 100 also has four compliment data inputs labeled negative a 112, negative b 114, negative c 116, and negative d 118. In addition, four-to-two reducer 100 has a true carry input (151) and a compliment carry input (152). Four-to-two reducer 100 has two true carry outputs (121 and 191) and two compliment carry outputs (122 and 192). Outputs 121 and 122 are intermediate carry outputs. Four-to-two reducer 100 also has a true sum output 168 and a compliment sum output 167. The inputs and outputs from four-to-two reducer 100 are each a single bit value. As would be appreciated by a person of skill in the art, a bit value is a voltage range that represents a logical value. The compliment inputs receive a compliment value of the corresponding the true inputs, and the compliment outputs provide a compliment of the corresponding true outputs. For example, if a input 111 receives a value of logic 1, then negative a input 112 will receive the value of logic 0. Two stages of a multistage clock (first clock 101 and second clock 102) are input to four-to-two reducer 100. In an embodiment, second clock 102 is a slightly delayed version of first clock 101. In an embodiment, the delay is the delay on an inverter with a fanout of 2. In an embodiment, the delay between clocks is 12 picoseconds (12 ps).

Figure 3:
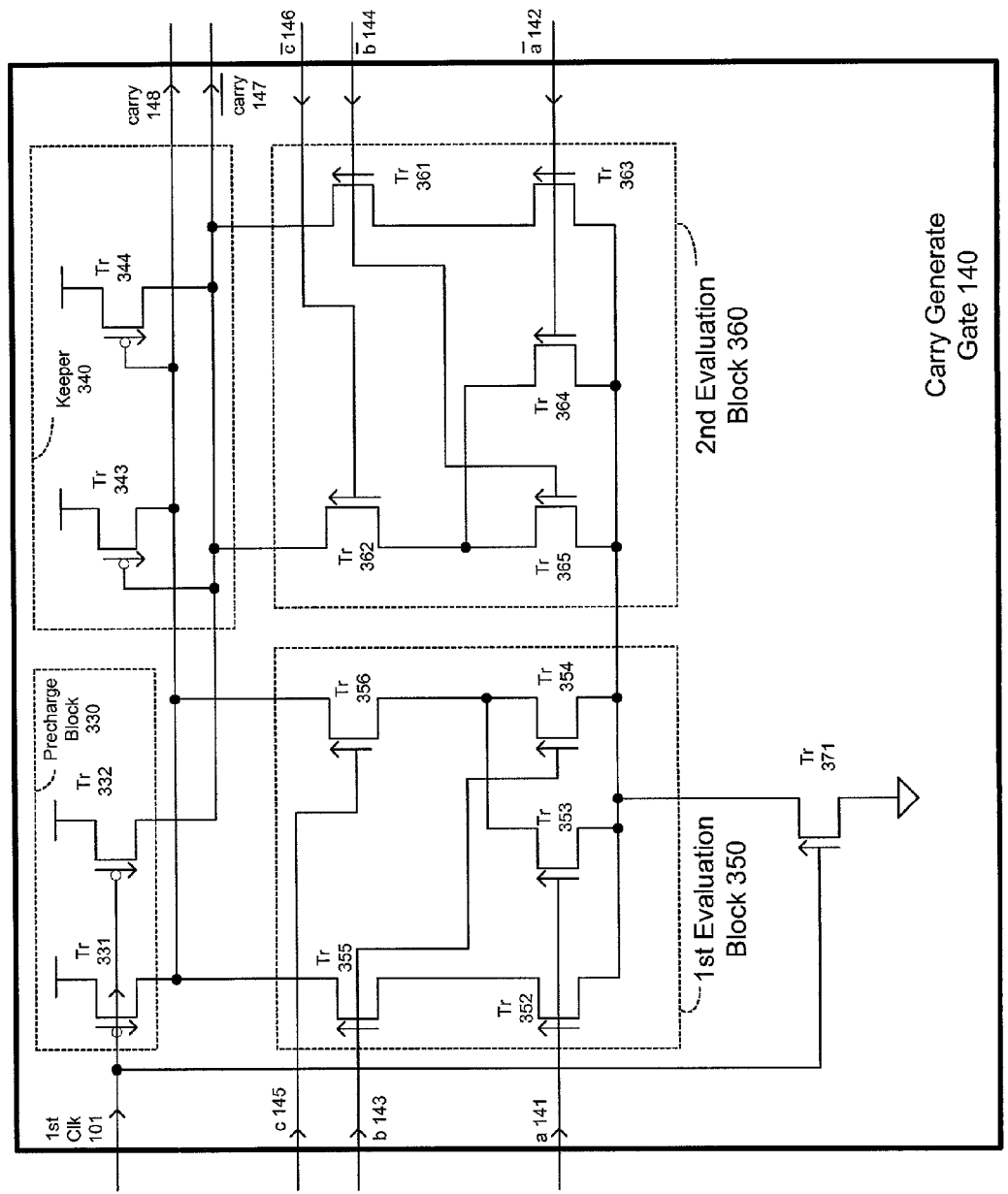
FIG. 3 is a partial block diagram of a symmetric carry generate gate according to another embodiment of the present invention.

In this embodiment, four-to-two reducer 100 is comprised of back-to-back three-to-two reducers. Outputs from first three-to-two reducer 120 are directly connected to second three-to-two reducer 150. First three-to-two reducer 120 is comprised of first XOR 130 and first carry generate gate 140. Similarly, second three-to-two reducer 150 is comprised of first XOR 160 and first carry generate gate 170. Second XOR gate 160 may provide the true and compliment sum output bits for four-to-two reducer 100, and second carry generate gate 170 may provide carry generate outputs for four-to-two reducer 100. First carry generate gate 140 may provide in addition carry output 148 and negative carry output 147 which are outputs of four-to-two reducer 100. In an embodiment, such as shown in FIG. 3, carry generate gates 140 and 170 are symmetric. In a further embodiment, XOR gates 130 and 170 are also symmetric. In this further embodiment, XOR gates 130 and 170 maybe any type of known or newly designed three-input differential XOR gates.

The topology of four-to-two reducer 100 will now be described in more detail. Data inputs 111 to 116 are connected respectively to inputs a 131, negative a 132, b 133, negative b 134, c 135, and negative c 136 of first XOR gate 130. Data inputs 111 to 116 are also connected respectively to inputs a 141, negative a 142, b 143, negative b 144, c 145, and negative c 146 of first carry generate gate 140. First clock 101 is input to first XOR 130 and first carry generate 140. First XOR 130 outputs a sum 138 and a negative sum 137 as well as a carry 148 and negative carry 147. Sum 138 of first XOR 130 is connected to a data input of second XOR 160 (c 165) and a data input of second carry generate gate 170 (c 175), and negative sum 137 of first XOR 130 is connected to a compliment data input of second XOR 160 (negative c 166) and a compliment data input of second carry generate 170 (negative c 176). Carry output 148 from first carry generate 140 is connected to carry out 121 for four-to-two reducer 100, and negative carry output 147 from first carry generate 140 is connected to negative carry out 122 for four-to-two reducer 100. Thus, the carry outputs (true and compliment) of first carry generate 140 provide the intermediate carry output bits for four-to-two reducer 140. The true and compliment carry in bits for four-to-two reducer 100 (carry in 151 and negative carry in 152) are connected respectively to inputs of second XOR 160 (b 163 and negative b 164) as well as to inputs of second carry generate gate 170 (b 173 and negative b 174). Finally, true and compliment inputs d 117 and negative d 118 of four-to-two reducer 100 are connected to respective inputs of second XOR 160 (a 161 and negative a 162) and second carry generate gate 170 (a 171 and negative a 172).

Second XOR 160 provides a sum output 168 and a negative sum output 167. The sum outputs of second XOR 160 may be the sum outputs of four-to-two reducer 100. Similarly, second carry generate gate 170 provides a carry output 178 and a negative carry output 177. The carry outputs of second carry generate gate 170 maybe the second carry bits that are output from four-to-two reducer 100. FIG. 1 shows set-reset (S/R) latch 180 and set-reset latch 190 coupled to four-to-two reducer 100. In particular, set-reset latch 180 has a sum input 181 coupled to sum output 168 of second XOR 160, a negative sum input 182 coupled to negative sum input 167 of second XOR 160, and a sum output 184. Similarly, set-reset latch 190 has a carry input 191 coupled to carry output 178 of second XOR 170, a negative carry input 192 coupled to negative carry input 177 of second XOR 170, and a carry output 194. In an embodiment, the set-reset latch 180 and set-reset latch 190 act as a dual rail domino to static converter and may be used to convert the outputs of four-to-two reducer 100 from domino logic to static logic. In another embodiment, a set dominant latch or other circuit may be used to perform this conversion function, the choice of which depends upon the desired use of the output.

The operation of four-to-two reducer 100 may be described with reference the following truth tables. These truth tables show the results that may be output from the embodiment shown in FIG. 1 based on various inputs. For the sake of simplicity, these truth tables only show the results for the various possible true input states. A person of skill in the art may easily derive the compliment input and outputs based on the truth tables below. Also for simplicity, the first table shows the states where carry in 151 is low (i.e., logic 0), and the second table shows the stages where carry in 151 is high (i.e., logic 1).

Truth Table for Four-to-two Reducer 100
(Part 1, carry in = 0)

| | | | | | | | | | | | | | | | | |
|---|---|---|---|---|---|---|---|---|---|---|---|---|---|---|---|---|
| a 111 | 0 | 0 | 0 | 0 | 0 | 0 | 0 | 0 | 1 | 1 | 1 | 1 | 1 | 1 | 1 | 1 |
| b 113 | 0 | 0 | 0 | 0 | 1 | 1 | 1 | 1 | 0 | 0 | 0 | 0 | 1 | 1 | 1 | 1 |
| c 115 | 0 | 0 | 1 | 1 | 0 | 0 | 1 | 1 | 0 | 0 | 1 | 1 | 0 | 0 | 1 | 1 |
| d 117 | 0 | 1 | 0 | 1 | 0 | 1 | 0 | 1 | 0 | 1 | 0 | 1 | 0 | 1 | 0 | 1 |
| carry in 151 | 0 | 0 | 0 | 0 | 0 | 0 | 0 | 0 | 0 | 0 | 0 | 0 | 0 | 0 | 0 | 0 |
| sum 138 | 0 | 0 | 1 | 1 | 1 | 1 | 0 | 0 | 1 | 1 | 0 | 0 | 0 | 0 | 1 | 1 |
| car 137 | 0 | 0 | 0 | 0 | 0 | 0 | 1 | 1 | 0 | 0 | 0 | 1 | 1 | 1 | 1 | 1 |
| sum 168 | 0 | 1 | 1 | 0 | 1 | 0 | 0 | 1 | 1 | 0 | 0 | 1 | 0 | 1 | 1 | 0 |
| car 177 | 0 | 0 | 0 | 1 | 0 | 1 | 0 | 0 | 0 | 1 | 0 | 0 | 0 | 0 | 0 | 1 |

Truth Table for Four-to-two Reducer 100
(Part 2, carry in = 1)

| | | | | | | | | | | | | | | | | |
|---|---|---|---|---|---|---|---|---|---|---|---|---|---|---|---|---|
| a 111 | 0 | 0 | 0 | 0 | 0 | 0 | 0 | 0 | 1 | 1 | 1 | 1 | 1 | 1 | 1 | 1 |
| b 113 | 0 | 0 | 0 | 0 | 1 | 1 | 1 | 1 | 0 | 0 | 0 | 0 | 1 | 1 | 1 | 1 |
| c 115 | 0 | 0 | 1 | 1 | 0 | 0 | 1 | 1 | 0 | 0 | 1 | 1 | 0 | 0 | 1 | 1 |
| d 117 | 0 | 1 | 0 | 1 | 0 | 1 | 0 | 1 | 0 | 1 | 0 | 1 | 0 | 1 | 0 | 1 |
| carry in 151 | 1 | 1 | 1 | 1 | 1 | 1 | 1 | 1 | 1 | 1 | 1 | 1 | 1 | 1 | 1 | 1 |
| sum 138 | 0 | 0 | 1 | 1 | 1 | 1 | 0 | 0 | 1 | 1 | 0 | 0 | 0 | 0 | 1 | 1 |
| car 137 | 0 | 0 | 0 | 0 | 0 | 0 | 1 | 1 | 0 | 0 | 0 | 1 | 1 | 1 | 1 | 1 |
| sum 168 | 1 | 0 | 0 | 1 | 0 | 1 | 1 | 0 | 0 | 1 | 1 | 0 | 1 | 0 | 0 | 1 |
| car 177 | 0 | 1 | 1 | 1 | 1 | 1 | 0 | 1 | 1 | 0 | 1 | 0 | 1 | 1 | 1 | 1 |

As can be seen from the truth tables above, the value output at sum 138 is the XOR of bits a 111, b 113, and c 115. The value output at carry 148 will be a 1 if and only if any two or more of bits a 111, b 113, and c 115 input a 1. The value output at sum 168 is the XOR of bits d 117, sum 138, and carry in 151. The value output at carry 178 will be a 1 if and only if any two or more of bits d 117, sum 138, and carry in 151 input a 1.

Figure 2:
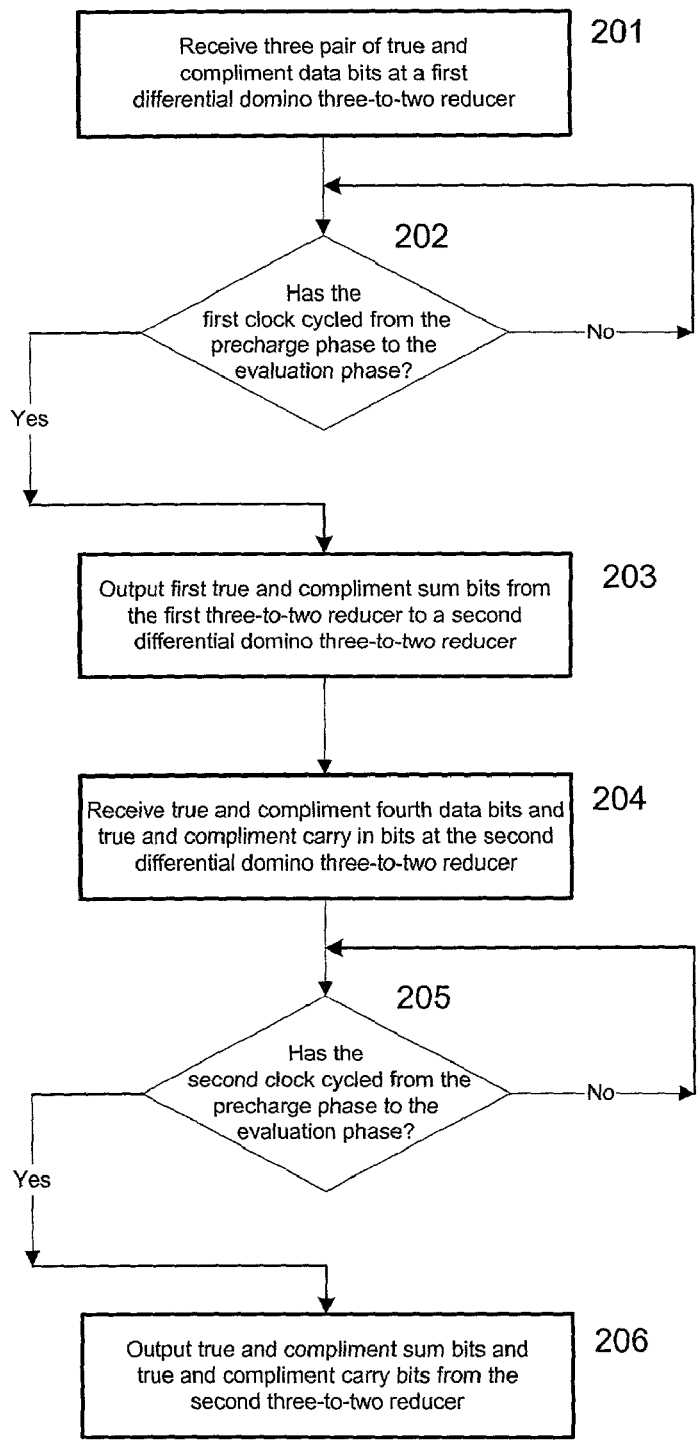
FIG. 2 is a flow diagram of a method of providing a four-to-two reducer function according to an embodiment of the present invention.

FIG. 2 is a flow diagram of a method of providing a four-to-two reducer function according to an embodiment of the present invention. This method will be discussed with reference to the embodiment shown in FIG. 1, but of course this method could also be performed with other embodiments. In this embodiment, three pair of true and compliment data bits (e.g., bits 111 to 112 of FIG. 1) are received at a first differential domino three-to-two reducer (201 of FIG. 2) such as first three-to-two reducer 120. In an embodiment, the data bits may be received at an XOR and a carry generate gate in the first three-to-two reducer (e.g., first XOR 130 and first carry generate 140). In an embodiment, the carry generate gate in the first three-to-two reducer is a symmetric carry generate gate.

After a first clock (e.g., first clock 101) cycles from an evaluation phase to a precharge phase (202 of FIG. 2), a first pair of true and compliment sum bits are output from the first three-to-two reducer to a second differential domino three-to-two reducer (203) such as second three-to-two reducer 150. In an embodiment, the first pair of true and compliment sum bits are outputted directly to the second three-to-two reducer from the first three-to-two reducer. A pair of true and compliment fourth data bits and a pair of true and compliment carry in bits are also received at the second three-to-two reducer (204). The fourth data bits and a pair of true and compliment carry in bits may be received at the second three-to-two reducer before, after, or at the same time as, the three pair of data bits are received at the first three-to-two reducer. In an embodiment, the sum bits, carry in bits, and fourth data bits may be received at an XOR and a carry generate gate in the second three-to-two reducer (e.g., second XOR 160 and second carry generate 170). In an embodiment, the carry generate gate in the second three-to-two reducer is a symmetric carry generate gate. After a second clock (e.g., second clock 102) cycles from an evaluation phase to a precharge phase (205 of FIG. 2), a second pair of true and compliment sum bits and a pair of carry output bits are output from the second three-to-two reducer (206). The second clock may be a delayed version of the first clock. For example, the second clock may be delayed from the first clock by approximately the delay of an inverter.

Figure 4:
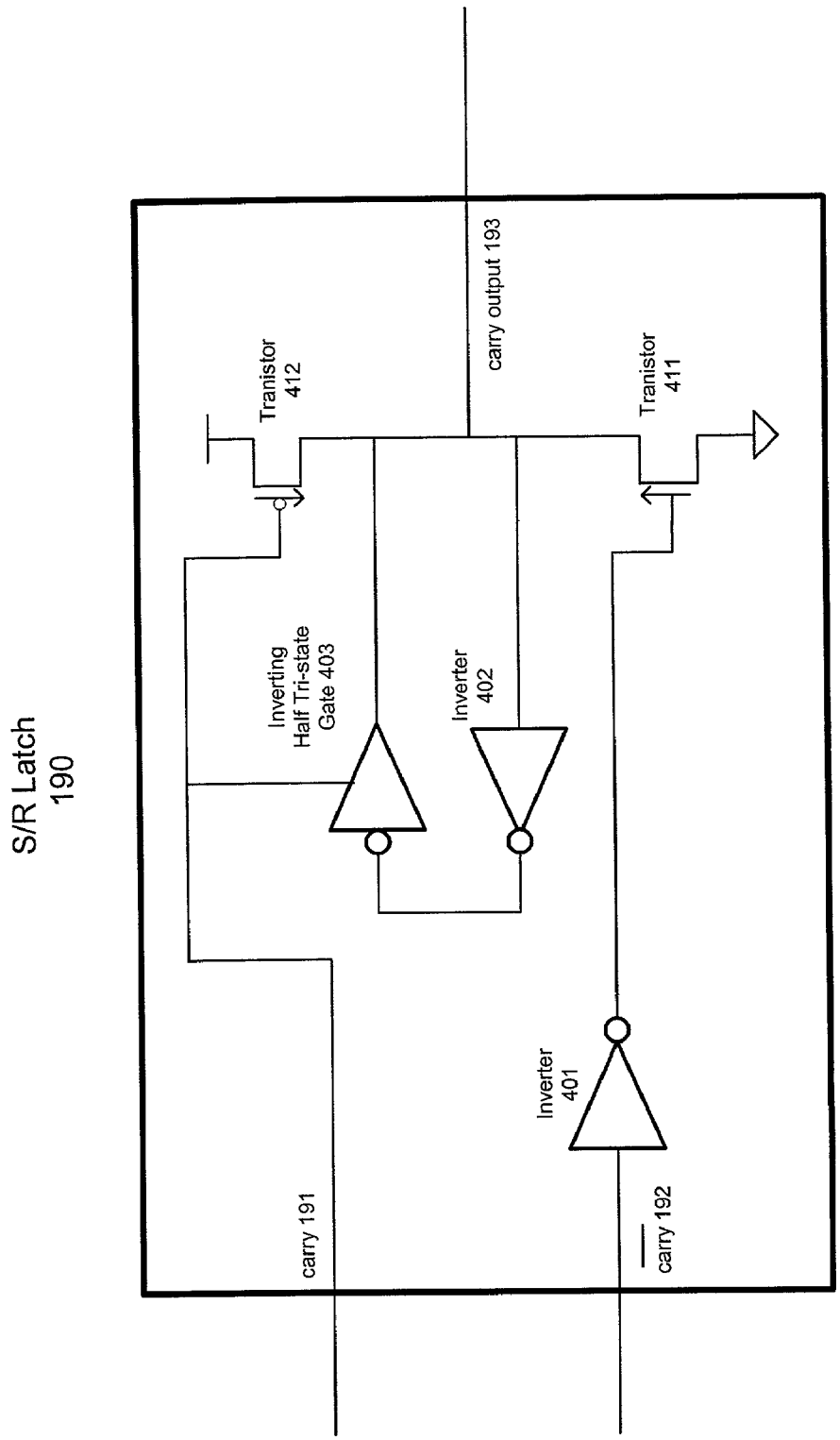
FIG. 4 is a partial block diagram of the set-reset latch shown in FIG. 1 according to an embodiment of the present invention.

The second pair of true and compliment sum bits and the pair of carry output bits may be the output from the four-to-two reducer. In an embodiment, the second pair of true and compliment sum bits and the pair of carry output bits are converted from domino logic to static logic by a dual domino to static converter or other device. An example of a set-reset latch that may be used is shown in FIG. 4.

FIG. 3 is a partial block diagram of symmetric carry generate gate 140 according to an embodiment of the present invention. Symmetric carry generate gate 170 of FIG. 1 may have the same topology as carry generate gate 140. As discussed above, carry generate gate 140 has three true inputs (a 141, b 143, and c 145) and three compliment inputs (negative a 142, negative b 144, and negative c 146). Carry generate gate 140 receives first clock 101. Carry generate has a carry output 148 and a negative carry output 147.

As shown in FIG. 3, carry generate 140 consists of a plurality of connected transistors that may be logically divided into a precharge block 330, a keeper 340, a first evaluation block 350, a second evaluation block 360, and a clock or footer transistor 371. In this embodiment, precharge block 330 comprises two PMOS transistors 331 and 332, and keeper 340 comprises two PMOS transistors 343 and 344. The source terminals ("sources") of transistors 331, 332, 343, and 344 are connected to Vcc. The gates of the transistors in precharge block 330 (331 and 332) are connected to clock 101. The drain terminal ("drain") of transistor 331 is connected to carry output 148, and the drain of transistor 332 is connected to negative carry output 147. The transistors in keeper 340 (transistors 343 and 344) are cross coupled. That is, the drain of transistor 343 is connected to the gate of transistor 344, and the drain of transistor 344 is connected to the gate of transistor 343. In addition, the drain of transistor 343 is connected to carry output 148 and the drain of transistor 344 is connected to negative carry output 147.

In this embodiment, footer transistor 371 and the transistors in first evaluation block 350 and second evaluation block 360 are NMOS transistors. Footer transistor 371 has its gate connected to clock 101, its drain connected to ground, and its source connected to the drains of three transistors in first evaluation block 350 (352, 353, and 354) and to the drains of three transistors in second evaluation block 360 (363, 364, and 365). The transistors in the evaluation blocks form a number of stacks from footer transistor 371 to either carry output 148 or negative carry output 147. Thus, footer transistor 137 provides a path to ground from the evaluation stacks. Transistors 355 and 352 are one example of such a stack. Transistor 355 has its drain connected to the source of transistor 352 and its source connected to carry output 148. Similarly, transistor 361 has its drain connected to the source of transistor 363 and its source connected to negative carry output 147. In addition, transistor 356 has its drain connected to the sources of transistors 353 and 354 and has its source connected to carry output 148. Finally, transistor 362 has its drain connected to the sources of transistors 364 and 365 and has its source connected to negative carry output 147. In this embodiment, the number of transistors in each of the stacks connecting footer transistor 317 to one of the outputs (147 and 148) is the same (i.e., 2 transistors).

The gates of the transistors in the evaluation blocks are connected to the data inputs to effectuate the desired carry generate function. Input a 141 is connected to the gates of transistors 352 and 353, and input negative a 142 is connected to the gates of transistors 363 and 364. Input b 143 is connected to the gates of transistors 355 and 354, and input negative b 144 is connected to the gates of transistors 361 and 365. Input c 145 is connected to the gates of transistor 356, and input negative c 146 is connected to the gates of transistor 362.

Carry generate gate 140 of FIG. 3 is symmetric. The first evaluation block 350 and second evaluation block 360 each have the same number of transistors (i.e., four transistors). In carry generate gate 140, the gate of each of the transistors in both the first evaluation block 350 and second evaluation block 360 is connected to one of the six data inputs (141 to 146) to carry generate gate 140. Another characteristic of the topology of carry generate gate 140 is that second evaluation block 360 has the same number of transistors in parallel relationship as first evaluation block 350 and the same number of transistors in serial relationship as the first evaluation block 350. In an embodiment, all of the transistors in carry generate gate 140 are 1 micron in size. Of course, in other embodiments the transistors may have other sizes and some or all of the transistors may be different sizes than other transistors. In an embodiment, the corresponding transistors in each evaluation block have the same size.

A person of skill in the art would appreciate that the truth tables above describe the operation of carry generate gate 140. Of course, the present invention is not limited to a carry generate such as shown in FIG. 3.

FIG. 4 is a partial block diagram of the set-reset latch 190 shown in FIG. 1 according to an embodiment of the present invention. Set dominant latch 180 of FIG. 1 may have the same topology as set-reset latch 190. Set dominant latch 190 has two invertors (401 and 402) and an inverting half tri-state gate 403. In addition, set-reset latch 190 has an NMOS transistor 411 and a PMOS transistor 412. Carry input 191 is connected to the gate of transistor 412 as well as to an input of half tri-state gate 403 so that half tri-state gate 403 may be pulled down by the carry 191 data path. Negative carry 192 is connected to an input to invertor 401. The output of inverter 401 is connected to the gate of transistor 411. The drain of transistor 411 is connected to ground, and the source of transistor 412 is connected to Vcc. The output of half tri-state gate 403 is connected to carry output 193 and to the input of inverter 402. The output of inverter 402 is connected to an input of half tri-state gate 403. Finally, the drain of transistor 412 and the source of transistor 411 are connected to carry output 193.

A person of skill in the art would appreciate that set-resent latch 190 is a static latch that performs as a dual rail to static convertor. A differential input (carry 191 and negative carry 192) is converted to a single carry output 193. When carry 191 is high (and thus negative carry 192 is low), then carry output 193 is high. Conversely, when carry 191 is low (and thus negative carry 192 is high), then carry output 193 is low.

The present invention provides a cascaded differential domino four-to-two reducer. The four-to-two reducer of the present invention is constructed of back to back differential domino three-to-two reducers. The cascaded differential domino four-to-two reducer of the present invention is relatively faster than prior four-to-two reducers because the circuit disclosed does not need to wait for the input to reach Vcc/2 (the gate threshold) before beginning to switch. The differential logic may act as a sense amp and allow for the clock to drive the transition with small differentials on the inputs. In addition, embodiments of the four-to-two reducer circuit of the present invention do not have any stacked PMOS devices.

Four-to-two reducers designed according to embodiments of the present invention may be used as a building block to create a variety of more complex circuits such as multipliers and redundant form adders. By eliminating the static stages in the reducer, use of the present invention may decreases the delay of the more complex circuit. In addition, leakage current and size can be reduced by the present invention because the threshold voltage (Vt) of transistors in the critical path may be lowered.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A circuit comprising
   a first three-to-two reducer;
   a second three-to-two reducer directly connected to the first three-to-two reducer;
   a first clock input connected to the first three-to-two reducer to receive a first clock signal; and
   a second clock input connected to the second three-to-two reducer to receive a second clock signal that is delayed from the first clock signal wherein the delay between the first clock signal and the second signal is approximately the delay of an inverter circuit with a fanout of 2.

2. The circuit of claim 1, wherein the circuit further comprises two set-reset latches to convert the outputs of the second three-to-two reducer to static logic.

3. The circuit of claim 1, wherein the first and second three-to-two reducer both comprise a symmetric carry generate gate.

4. The circuit of claim 3, wherein the symmetric carry generate gates have a first evaluation block of transistors and a second evaluation block of transistors, wherein the first evaluation block and second evaluation block each have the same number of transistors.

5. The circuit of claim 4, wherein the symmetric carry generate gates have six data inputs, and wherein the gate of each of the transistors in both the first evaluation block and the second evaluation block is connected to one of the six data inputs.

6. The circuit of claim 4, wherein the first evaluation block comprises a plurality of transistors connected in a parallel relationship to each other and a plurality of transistors connected in a serial relationship to each other, wherein the second evaluation block comprises a plurality of transistors connected in a parallel relationship to each other and a plurality of transistors connected in a serial relationship to each other, and wherein the second evaluation block has the same number of transistors in said parallel relationship as the first evaluation block and the same number of transistors in said serial relationship as the first evaluation block.

7. A circuit comprising:
a first differential domino three-to-two reducer having three differential inputs and two differential outputs, wherein the first differential domino three-to-two reducer has an input to receive a first clock signal; and
a second differential domino three-to-two reducer having three differential inputs and two differential outputs, wherein one of the differential inputs of the second differential three-to-two reducer is connected to a differential output of the first differential three-to-two reducer, wherein the second differential domino three-to-two reducer has an input to receive a different clock signal.

8. The circuit of claim 7, wherein there are no static stages between the first and second differential domino three-to-two reducers.

9. The circuit of claim 7, wherein the first differential three-to-two reducer comprises:
a differential exclusive—OR (XOR) gate having three differential inputs and a differential output; and
a differential carry generate gate having three differential inputs and a differential output.

10. The circuit of claim 9, wherein the three differential inputs to the carry generate gate comprise three true inputs and three complement inputs, and wherein the Miller coupling for the true inputs is equal to the Miller coupling for the complement inputs.

11. The circuit of claim 10, wherein the differential output of the carry generate gate comprises a true output and a complement output, and wherein the output drive strength for the true output is the same as the output drive strength for the complement output.

12. The circuit of claim 9, wherein the load for the true inputs to the carry generate gate is the same as the load for the complement inputs, wherein the pull down strength for the true output is the same as the pull down strength for the complement output, and wherein the pull down strength for the true inputs is the same as the pull down strength for the complement inputs.

13. A method comprising:
receiving three pair of true and complement data bits at a first differential domino three-to-two reducer;
outputting a first pair of true and complement sum bits from the first three-to-two reducer to a second differential domino three-to-two reducer during the evaluation phase of a first clock;
receiving a fourth pair of true and complement data bits at the second differential domino reducer; and
outputting a second pair of true and complement sum bits and a pair of true and complement carry output bits output during the evaluation phase of a second clock that is delayed from the first clock.

14. The method of claim 13, wherein the first pair of true and complement sum bits are outputted directly to the second three-to-two reducer from the first three-to-two reducer.

15. The method of claim 14, wherein providing the first true and complement sum bits to the second three-to-two reducer comprises:
outputting the first true and complement sum bits to an exclusive—or (XOR) gate; and
outputting the first true and complement sum bits to a symmetric carry generate gate.

16. The method of claim 13, wherein the method further comprises:
receiving the second true and complement sum bits at a first latch;
outputting a true sum output from the first latch;
receiving the true and complement carry output bits at a second latch; and
outputting a complement sum output from the second latch.

17. A circuit comprising a domino four-to-two reducer, wherein the four-to-two reducer comprises:
a first three-to-two reducer that comprises a first logic gate, the first logic gate comprising a first evaluation block and a plurality of outputs, the first evaluation block comprising N-channel metal-oxide semiconductor transistors;
a second three-to-two reducer that comprises a second logic gate, the second logic gate comprising a second evaluation block and a plurality of inputs that are directly connected to the outputs of the first logic gate, the second evaluation block comprising N-channel metal-oxide semiconductor transistors:
a first clock input connected to the first three-to-two reducer to receive a first clock signal; and
a second clock input connected to the second three-to-two reducer to receive a second clock signal that is delayed from the first clock signal.

18. The circuit of claim 17 wherein the delay between the first clock signal and the second clock signal is approximately the delay of an inverter with a fanout of 2.

19. The circuit of claim 17, wherein the four-to-two reducer further comprises two set-reset latches to convert the outputs of the second three-to-two reducer to static logic.

20. The circuit of claim 17, wherein the first evaluation block and second evaluation block each have the same number of transistors.

21. The circuit of claim 17, wherein the first logic gate and second logic gate are both symmetric carry generate gates.

22. The circuit of claim 21, wherein the symmetric carry generate gates have six data inputs, and wherein the gate of each of the transistors in both the first evaluation block and the second evaluation block is connected to one of the six data inputs.

23. The circuit of claim 17, wherein the first evaluation block comprises a plurality of transistors connected in a parallel relationship to each other and a plurality of transistors connected in a serial relationship to each other, wherein the second evaluation block comprises a plurality of transistors connected in a parallel relationship to each other and a plurality of transistors connected in a serial relationship to each other, and wherein the second evaluation block has the same number of transistors in said parallel relationship as the first evaluation block and the same number of transistors in said serial relationship as the first evaluation block.

24. A circuit comprising:
a first differential domino three-to-two reducer having three differential inputs and two differential outputs; and
a second differential domino three-to-two reducer having three differential inputs and two differential outputs, wherein one of the differential inputs of the second differential three-to-two reducer is connected to a differential output of the first differential three-to-two reducer, and wherein there are no static stages between the first and second differential domino three-to-two reducers, wherein the first differential domino three-to-two reducer has an input to receive a first clock signal and the second differential domino three-to-two reducer has an input to receive a different clock signal.

25. The circuit of claim 24, wherein the first differential three-to-two reducer comprises:
a differential exclusive-OR (XOR) gate having three differential inputs and a differential output; and
a differential carry generate gate having three differential inputs and a differential output.

26. The circuit of claim 25, wherein the three differential inputs to the carry generate gate comprise three true inputs and three complement inputs, and wherein the Miller coupling for the true inputs is equal to the Miller coupling for the complement inputs.

27. The circuit of claim 26, wherein the differential output of the carry generate gate comprises a true output and a complement output, and wherein the output drive strength for the true output is the same as the output drive strength for the complement output.

28. The circuit of claim 25, wherein the load for the true inputs to the carry generate gate is the same as the load for the complement inputs, wherein the pull down strength for the true output is the same as the pull down strength for the complement output, and wherein the pull down strength for the true inputs is the same as the pull down strength for the complement inputs.

* * * * *